(No Model.)
O. VON BRIESEN.
BRIDLE.
No. 463,962. Patented Nov. 24, 1891.
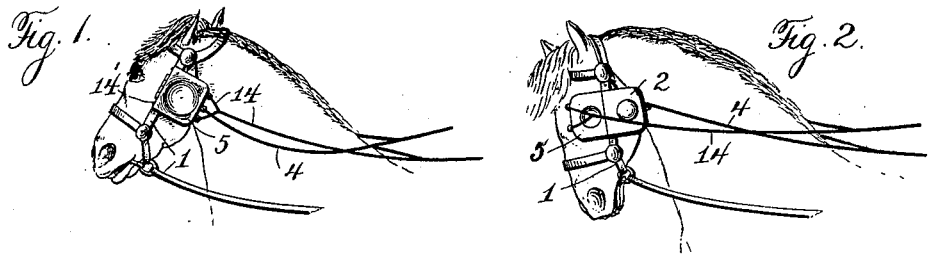
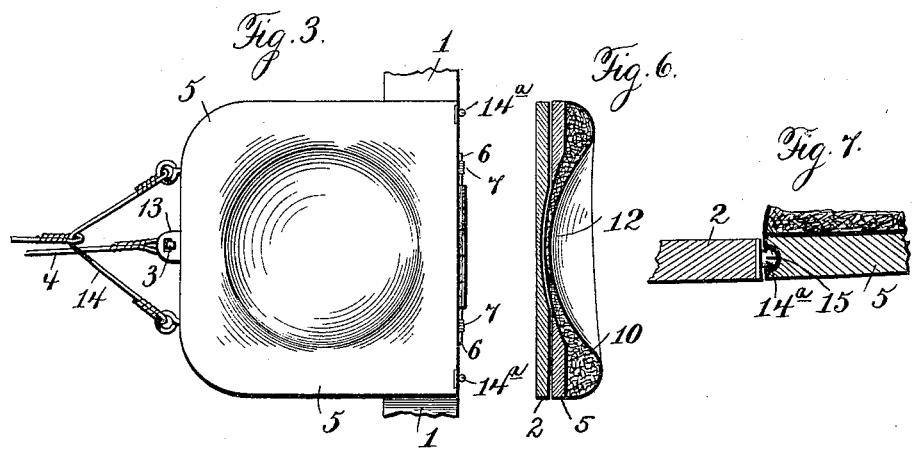
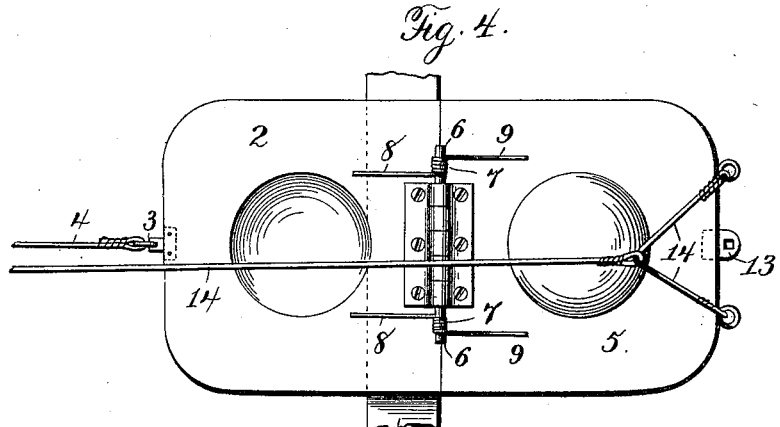
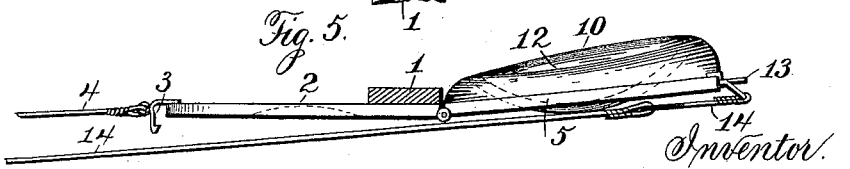
Witnesses:
Jas. E. Hutchinson
A. H. Norris
Inventor
Otto von Briesen,
By James L. Norris
Attorney
THE NORRIS PETERS CO., PHOTO-LITHO., WASHINGTON, D. C.

UNITED STATES PATENT OFFICE.

OTTO VON BRIESEN, OF DRESDEN, SAXONY, GERMANY.

BRIDLE.

SPECIFICATION forming part of Letters Patent No. 463,962, dated November 24, 1891.

Application filed May 28, 1891. Serial No. 394,357. (No model.)

*To all whom it may concern:*

Be it known that I, OTTO VON BRIESEN, a citizen of Germany, residing at 14 Seidnitzer Street, Dresden, in the Kingdom of Saxony, Germany, have invented certain new and useful Improvements in Blind Attachments for Bridles; and I do hereby declare the following to be a full, clear, and exact description of the invention, such as will enable others skilled in the art to which it appertains to make and use the same.

This invention has for its object to provide novel, simple, and effective mechanism connected with a bridle and under control of the driver for blinding a wild or skittish animal if occasion demands, as when the animal becomes frightened at some object, or from any other cause.

To accomplish this object my invention involves the features of construction and the combination or arrangement of devices hereinafter described and claimed, reference being made to the accompanying drawings, in which—

Figure 1 is a side view showing my invention applied to the head of an animal, the parts being in their normal position. Fig. 2 is a similar view showing the blind-flap in position to blind the animal. Fig. 3 is a detail side view showing the blind-flap in its folded position. Fig. 4 is a similar view showing the blind-flap unfolded. Fig. 5 is a top edge view of the same. Fig. 6 is a transverse sectional view of the blind-flap and its carrying-plate, and Fig. 7 is a detail sectional view showing the spring-catch for holding the blind-flap unfolded.

In order to enable those skilled in the art to make and use my invention, I will now describe the same in detail, referring to the drawings, wherein—

The numeral 1 indicates the cheek-strap of a bridle, to which is attached in any suitable manner a carrying-plate 2, having at its rear edge a spring-catch 3, connected to and operated by a line 4, extending to a point within convenient reach of the driver. To the front edge of the carrying-plate is connected by a spring-hinge the blind-flap 5, which is adapted to fold backward upon the carrying-plate, as in Figs. 1, 3, and 6, and to unfold therefrom under the influence of the spring-hinge to blind the eye of the animal, as in Figs. 2, 4, and 5. The parts are duplicated at the side of the bridle opposite that shown, but a description of those at one side will be sufficient for the proper understanding of my invention. The spring-hinge, as here shown, is composed of two hinge-leaves articulated together by a pintle 6, on which are coiled portions of two spring-wires, as at 7, the extremities 8 and 9 of the wires bearing, respectively, against the carrying-plate 2 and blind-flap 5, so that when the latter is unrestrained the springs operate to throw it forward into the position shown in Figs. 2, 4, and 5.

The blind-flap is composed of a suitable frame having a bolster 10 attached thereto and provided with a concave seat 12, which is adapted to fit over the eye of the animal and obstruct his vision. The free edge of the blind-plate carries a catch-plate 13, and is connected to the divergent portions of a line 14, which extends to a point within convenient reach of the driver in such manner that by pulling the line to draw the blind-flap backward and then giving it a quick or sudden jerk the catch-plate 13 springs into engagement with the spring-catch 3 for retaining the blind-flap in its folded or retracted position, as in Fig. 1. If an animal becomes wild or frightened from any cause, a slight pull on the line 4 releases the spring-catch 3 from the catch-plate 13, and instantly the blind-flap 5 is unfolded or projected forward by the action of the spring-hinge to blind the animal, as in Fig. 2.

To retain the blind-flap in its correct unfolded or projected position over the eye of the animal I provide the front edge of the carrying-plate 2 with spring-catches 14, (one or more,) which engage sockets 15 in the hinged or pivoted edge of the blind-flap, as in Fig. 7. The spring-catches are preferably composed of split balls similar to a glove-fastening, and they retain the blind-flap with sufficient security to prevent shaking movements of the head from displacing the blind-flap when the latter is unfolded or projected to blind the animal.

If the formation of the concave seat in the bolster produces a convex projection at one side of the blind-flap, as in the drawings, the carrying-plate should be recessed to receive the projection, so that the parts can rest flat against each other.

Having thus described my invention, what I claim is—

1. The combination, with a bridle, of carrying-plates secured to the cheek-straps and each having a catch at its rear edge, the blind-flaps having spring-hinge connections with the front edges of the carrying-plates, and each provided at its outer free edge with a catch-plate, a line connected with the free outer edge of each blind-flap for swinging it outward and rearward to engage its catch-plate with the catch at the rear edge of a carrying-plate, and another line connected with each catch for releasing it from engagement with the catch-plate to permit the blind-flap to automatically swing outward and forward over the eye of the animal, substantially as described.

2. A blind attachment for bridles, consisting of the carrying-plates having spring-catches at both their front and rear edges, the blind-flaps having sockets and spring-hinge connections at one edge with the front edges of the carrying-plates, and lines connected, respectively, with the blind-flaps and the spring-catches at the rear edges of the carrying-plates, substantially as described.

In testimony whereof I affix my signature in presence of two witnesses.

OTTO VON BRIESEN.

Witnesses:
CARL FR. KEICHELT,
PAUL DRUCKMÜLLER.